March 28, 1939.  C. S. JENNINGS ET AL  2,152,312
TREATMENT OF LEATHER
Filed Aug. 4, 1936  14 Sheets-Sheet 1
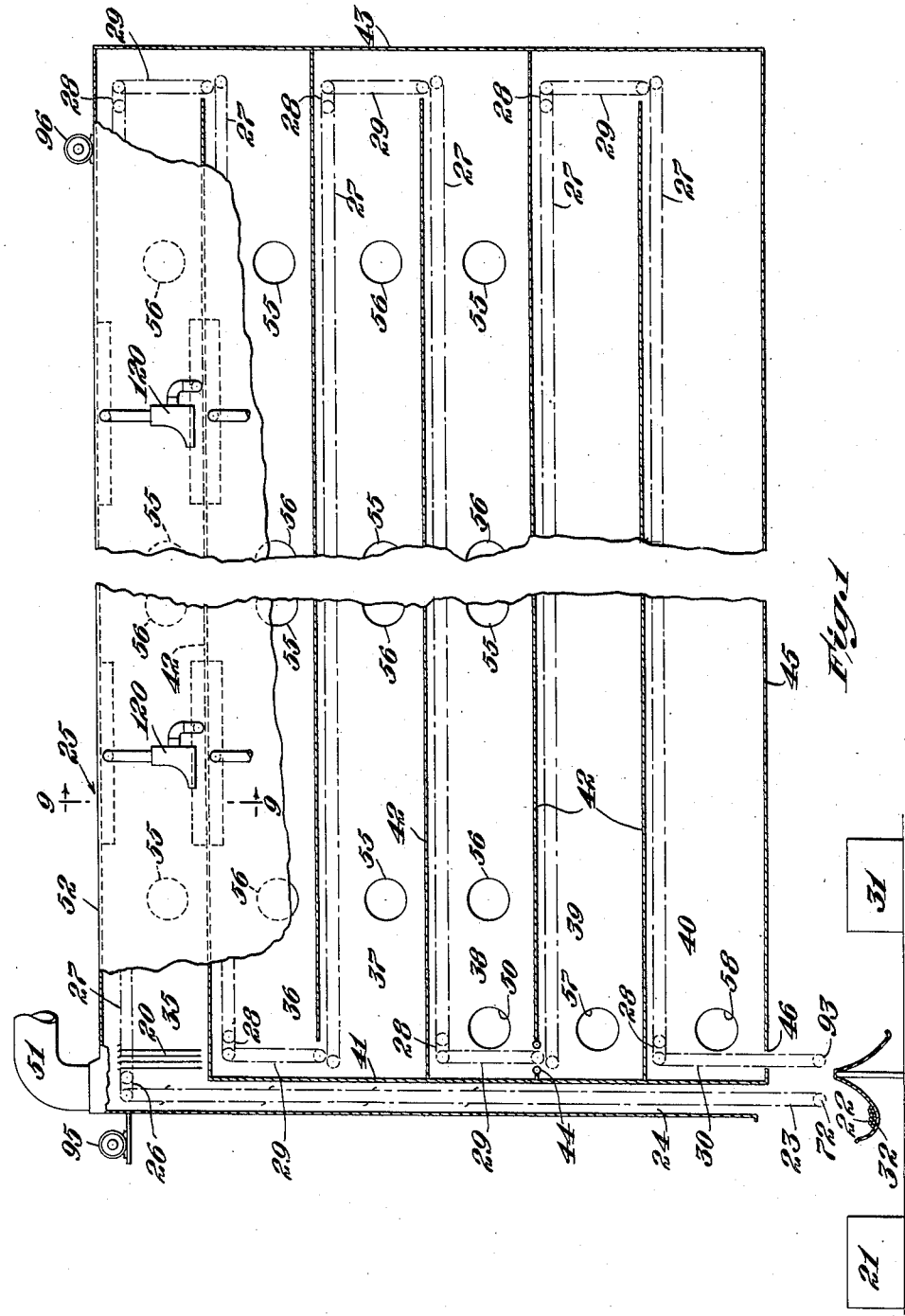
Inventors
Chester S. Jennings
Frank W. Gerard
by Roberts, Cushman & Woodbury
Att'ys.

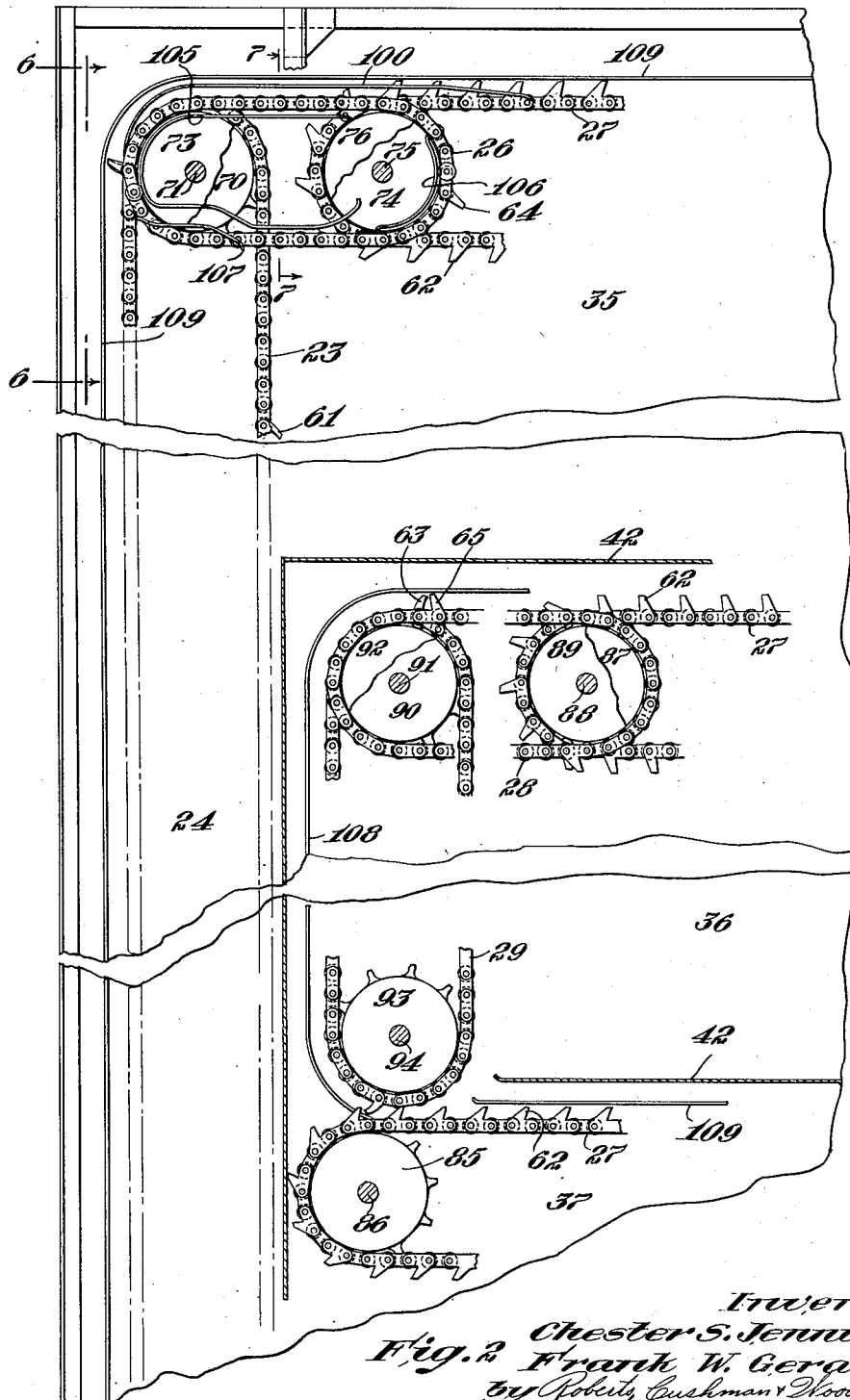

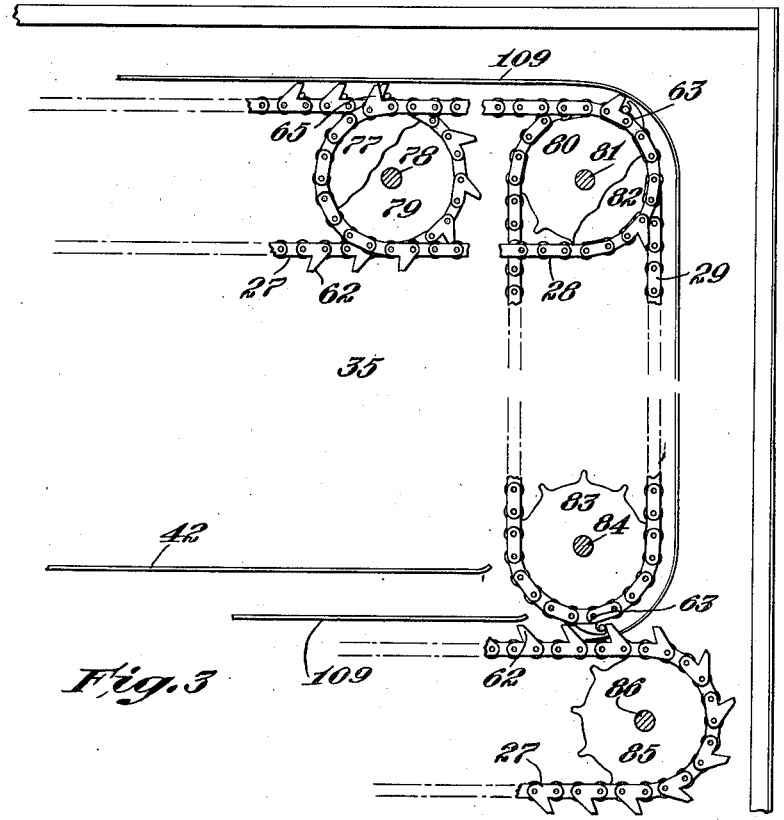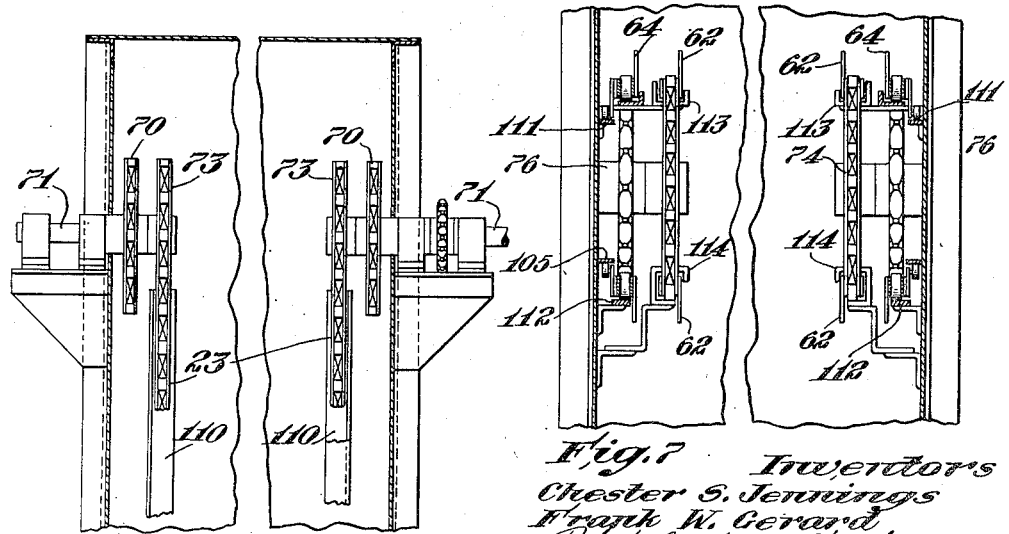

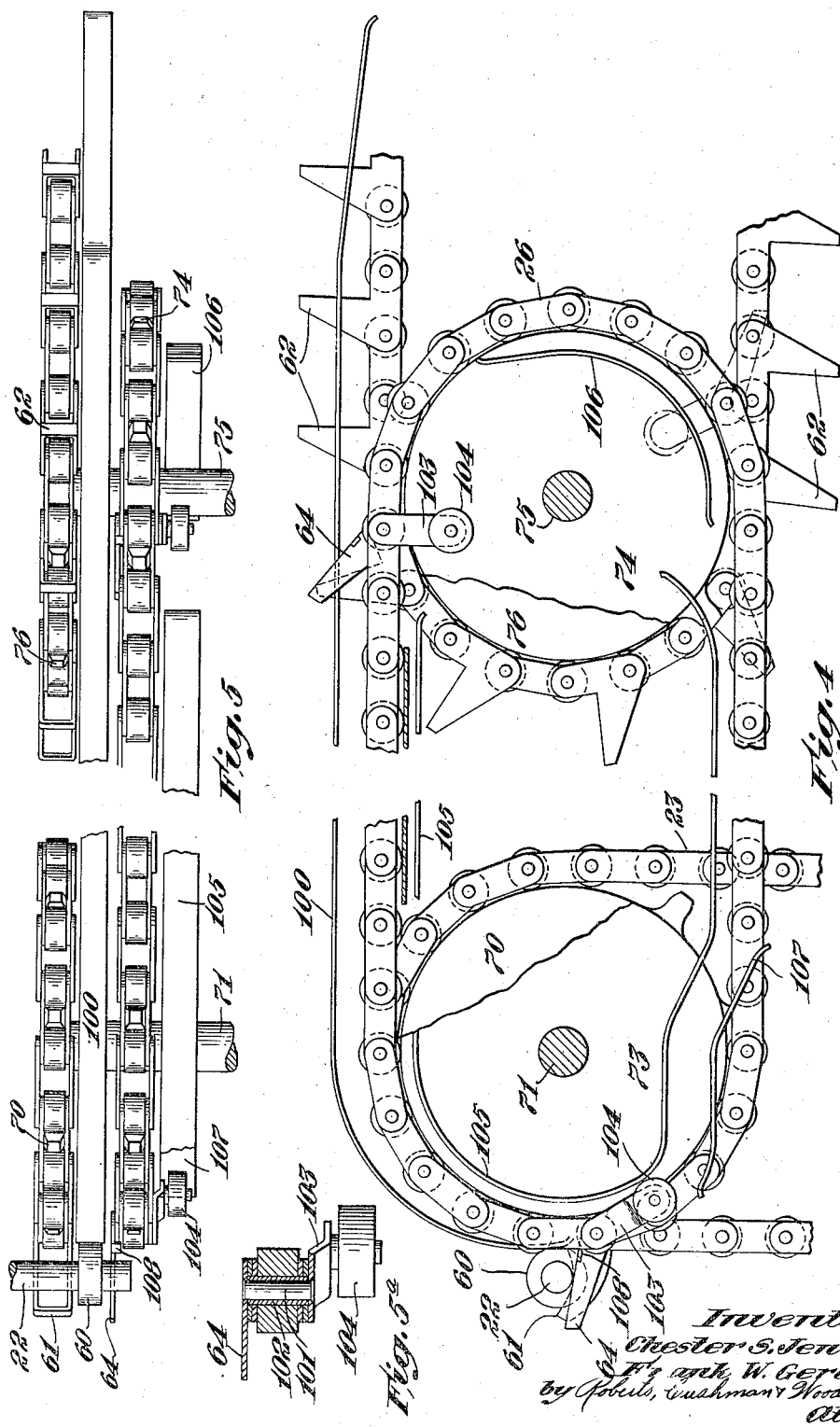

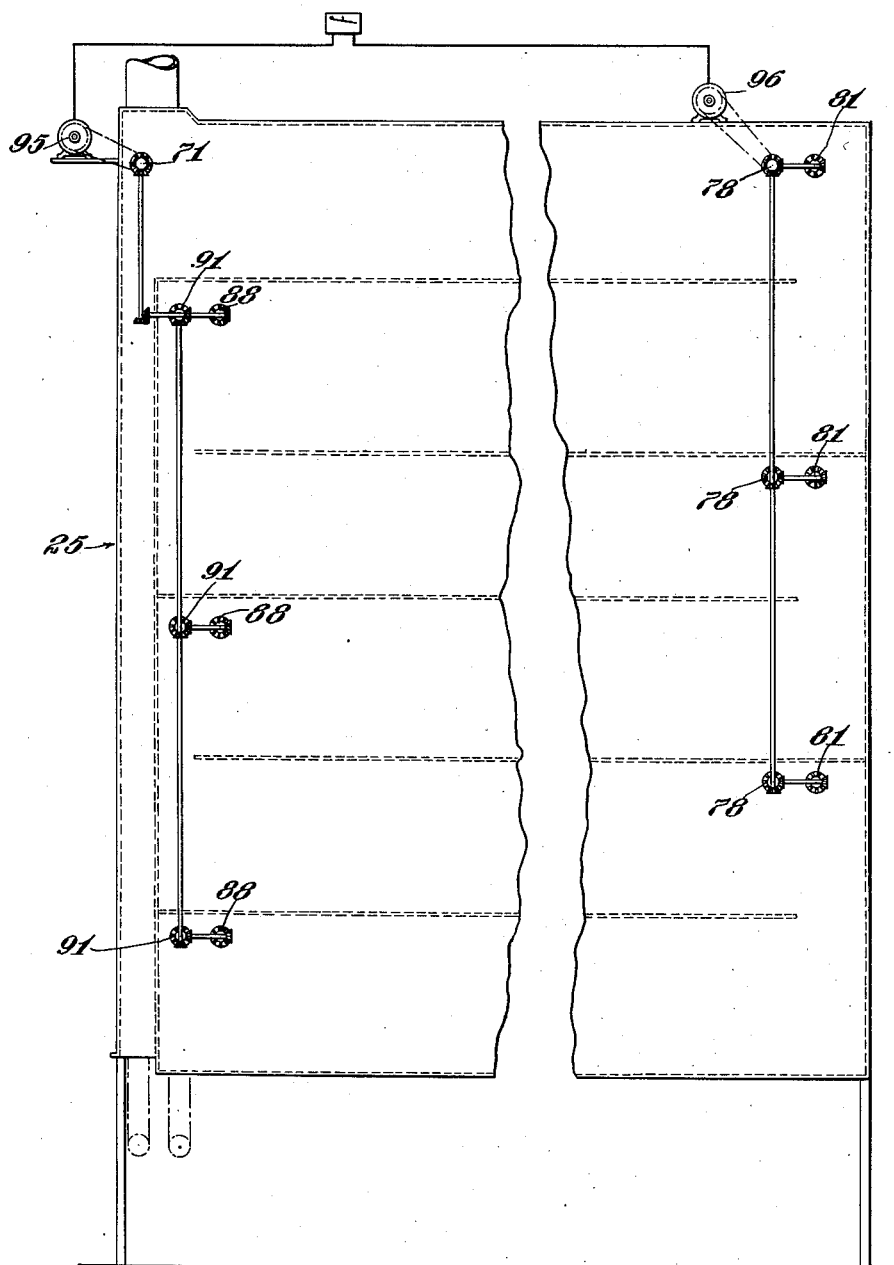

March 28, 1939.  C. S. JENNINGS ET AL  2,152,312
TREATMENT OF LEATHER
Filed Aug. 4, 1936  14 Sheets-Sheet 7
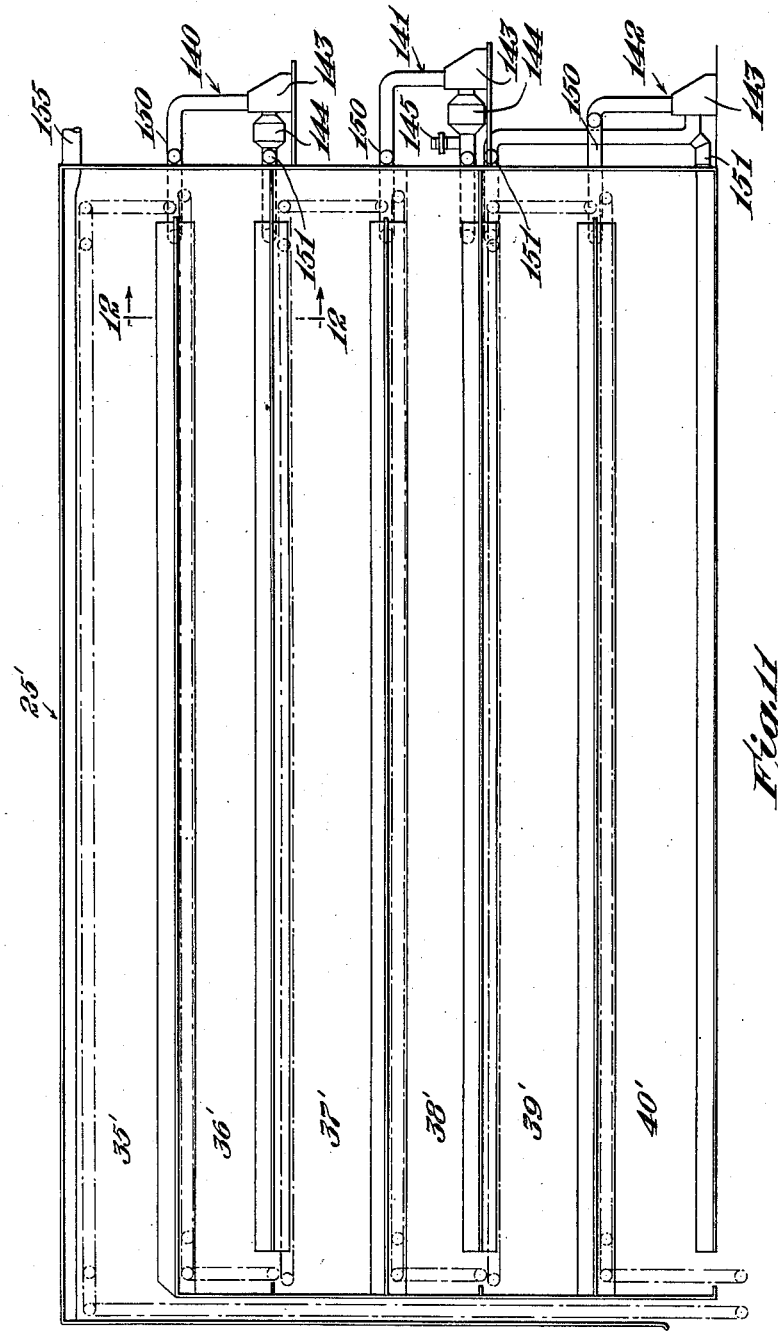
Inventors
Chester S. Jennings
Frank W. Gerard
by Roberts, Cushman & Woodbury
Att'ys.

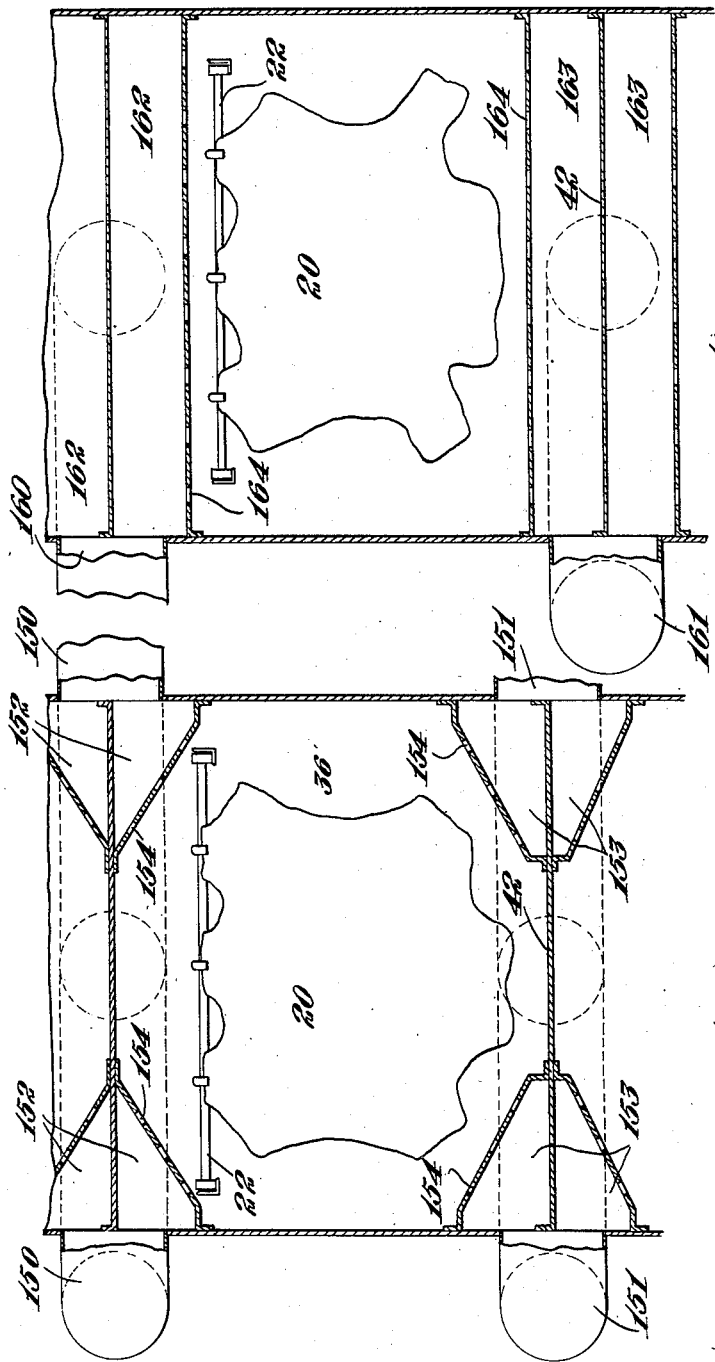

March 28, 1939.  C. S. JENNINGS ET AL  2,152,312
TREATMENT OF LEATHER
Filed Aug. 4, 1936  14 Sheets-Sheet 9
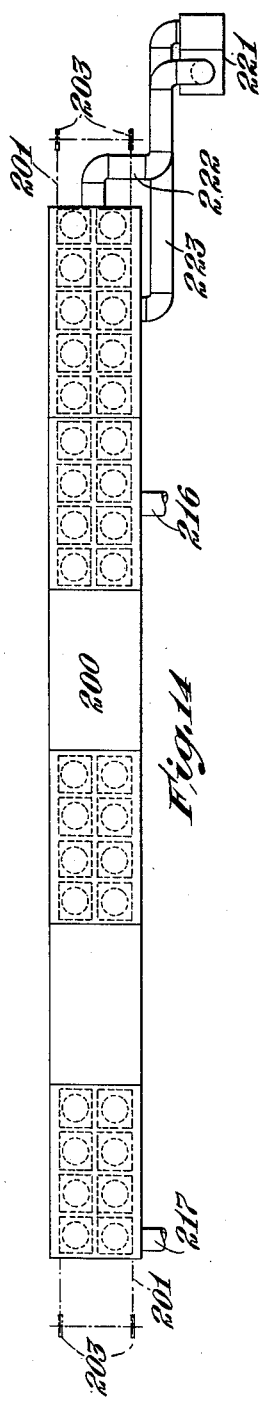
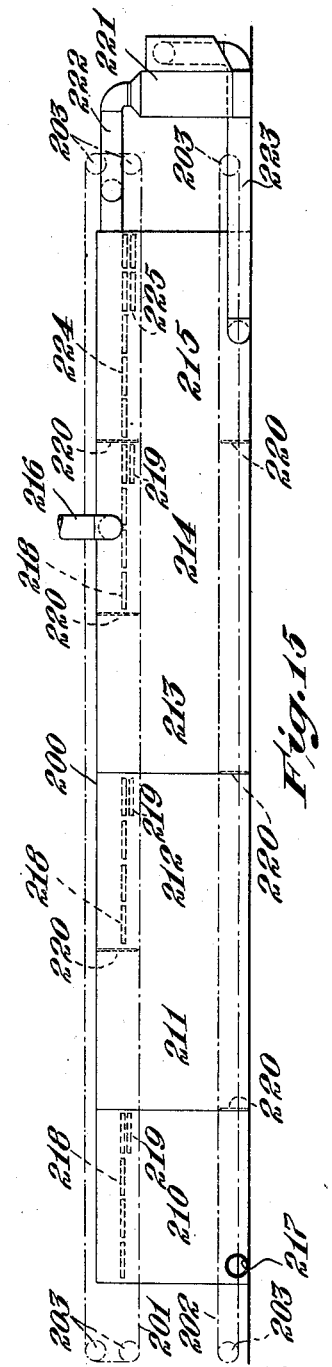
Inventors
Chester S. Jennings
Frank W. Gerard
by Roberts, Cushman & Woodberry
Att'ys.

March 28, 1939.  C. S. JENNINGS ET AL  2,152,312
TREATMENT OF LEATHER
Filed Aug. 4, 1936   14 Sheets-Sheet 10

Inventors
Chester S. Jennings
Frank W. Gerard
by Roberts, Cushman & Woodberry
Att'ys.

March 28, 1939.     C. S. JENNINGS ET AL     2,152,312
TREATMENT OF LEATHER
Filed Aug. 4, 1936     14 Sheets-Sheet 12
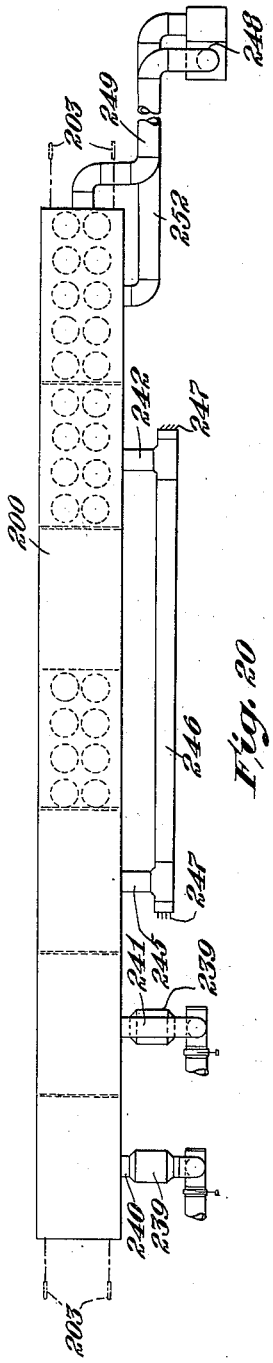
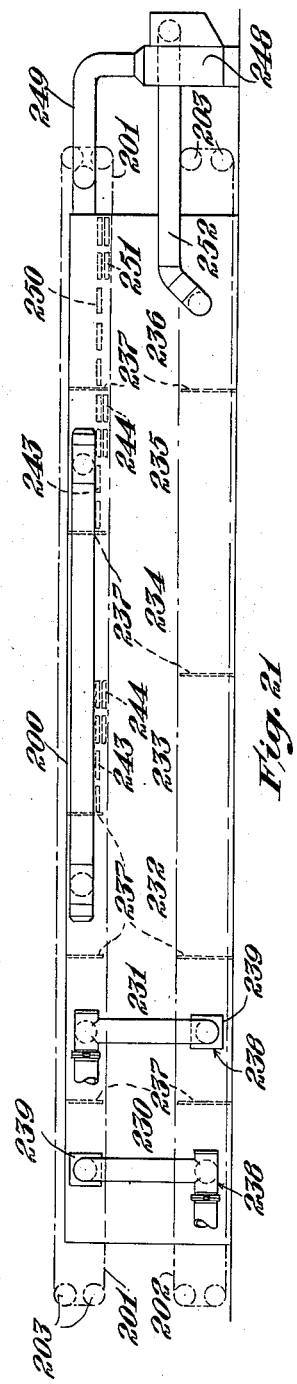
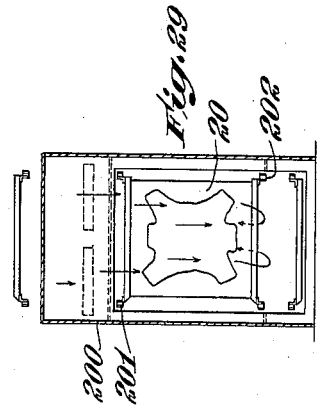
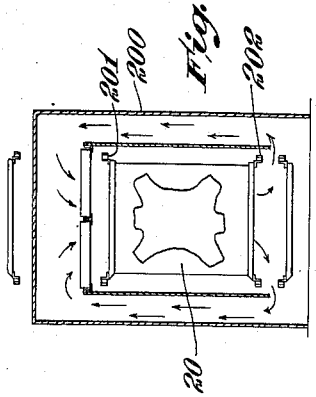
Inventors
Chester S. Jennings
Frank W. Gerard
by Roberts, Cushman & Woodbury
Att'ys.

March 28, 1939.  C. S. JENNINGS ET AL  2,152,312
TREATMENT OF LEATHER
Filed Aug. 4, 1936  14 Sheets-Sheet 13

Inventors
Chester S. Jennings
Frank W. Gerard
by Roberts, Cushman & Woodbury
Att'ys.

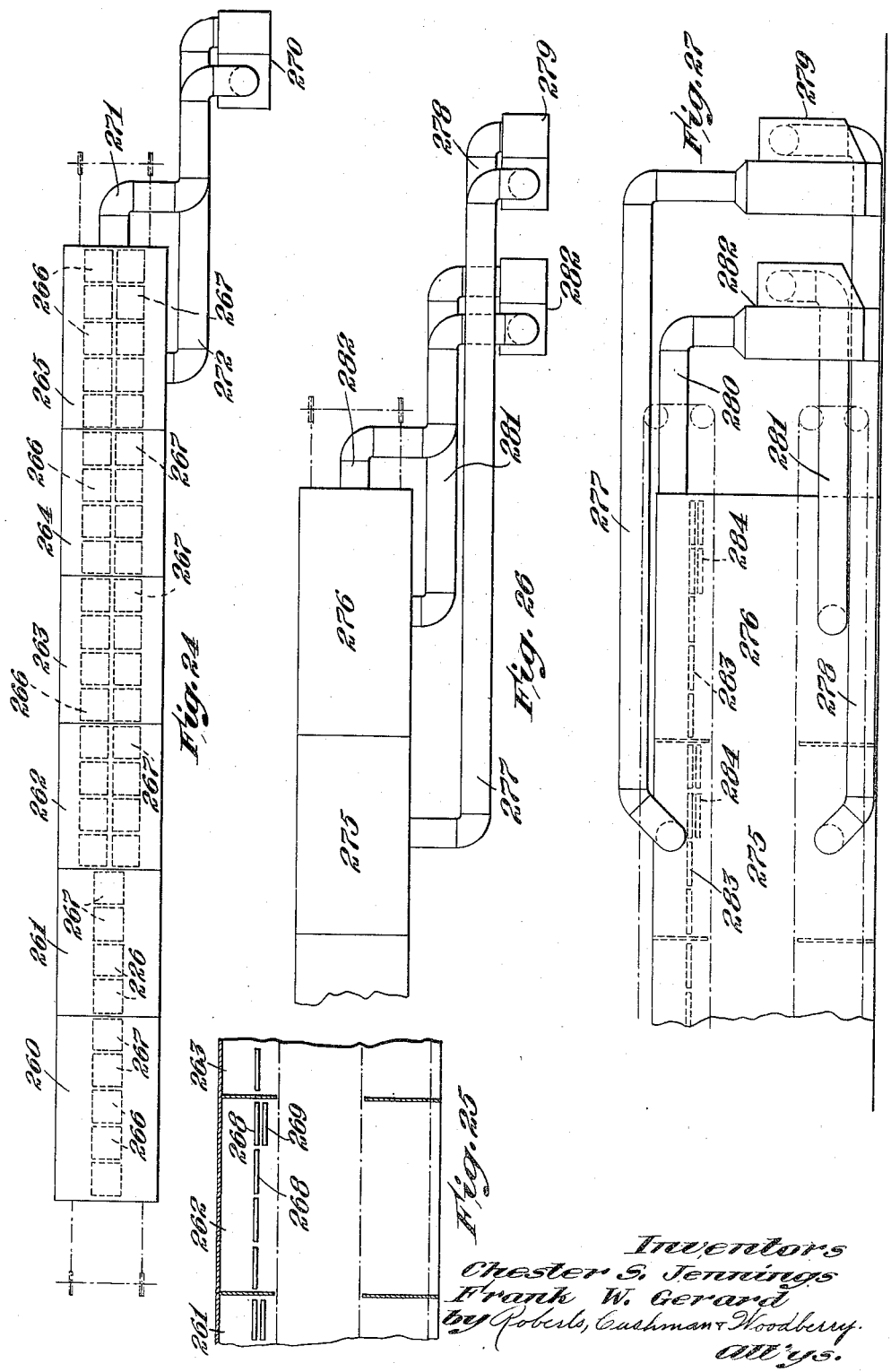

Patented Mar. 28, 1939

2,152,312

UNITED STATES PATENT OFFICE 2,152,312

TREATMENT OF LEATHER

Chester S. Jennings, Syracuse, N. Y., and Frank W. Gerard, Dayton, Ohio, assignors to The Lamson Company, Syracuse, N. Y., a corporation of Massachusetts Application August 4, 1936, Serial No. 94,138

6 Claims. (Cl. 34—24)

This invention relates to an improvement in the treatment of leather and more particularly in that treatment of hides by which they are brought into the most favorable condition for staking and in the apparatus by which such treatment may be carried out.

Heretofore hides have generally been dried by hanging or stretching them and allowing them to dry slowly subjected either to the outside atmosphere or to the atmosphere of a room or chamber in which the temperature of the air may be controlled. Whichever way the hides were dried the drying medium was throughout the drying operation substantially uniform in condition, i. e. in temperature and humidity.

The primary object of this invention is to reduce to a minimum the time required to dry the leather and to control the drying treatment so that the leather at the completion of the treatment is in the most favorable condition for staking.

Various ways may be employed to attain this object, for example, the leather may be subjected first to the action of air which is substantially free from moisture and second to the action of humidified air. Ordinary room air may be supplied to the leather being treated, by the employment of fans if desired, either in addition to the two forms of air just mentioned or as substitute for either or both such forms.

Another object of this invention is to bring a stream of drying air into contact with the leather being dried in various directions, for example, parallel or perpendicular to the face thereof or at any acute angle thereto or in contact with the center of the hides before treating the entire surface uniformly.

Further objects of this invention reside in the provision of definite controls for the speed of travel of the hides, and the status of the air to which they are subjected as well as the details of construction of the apparatus used.

These and other objects of the invention will appear from a consideration of the following description in which they are set forth at length and of the drawings which form a part of such description and in which Fig. 1 illustrates diagrammatically in side elevation one form of apparatus by which this invention may be carried out;

Figs. 2 and 3 are views on an enlarged scale of portions of such apparatus;

Fig. 4 is a side elevation on a still more enlarged scale of certain of the conveyor elements of the apparatus;

Fig. 5 is a plan view of the elements shown in Fig. 4;

Figure 9:
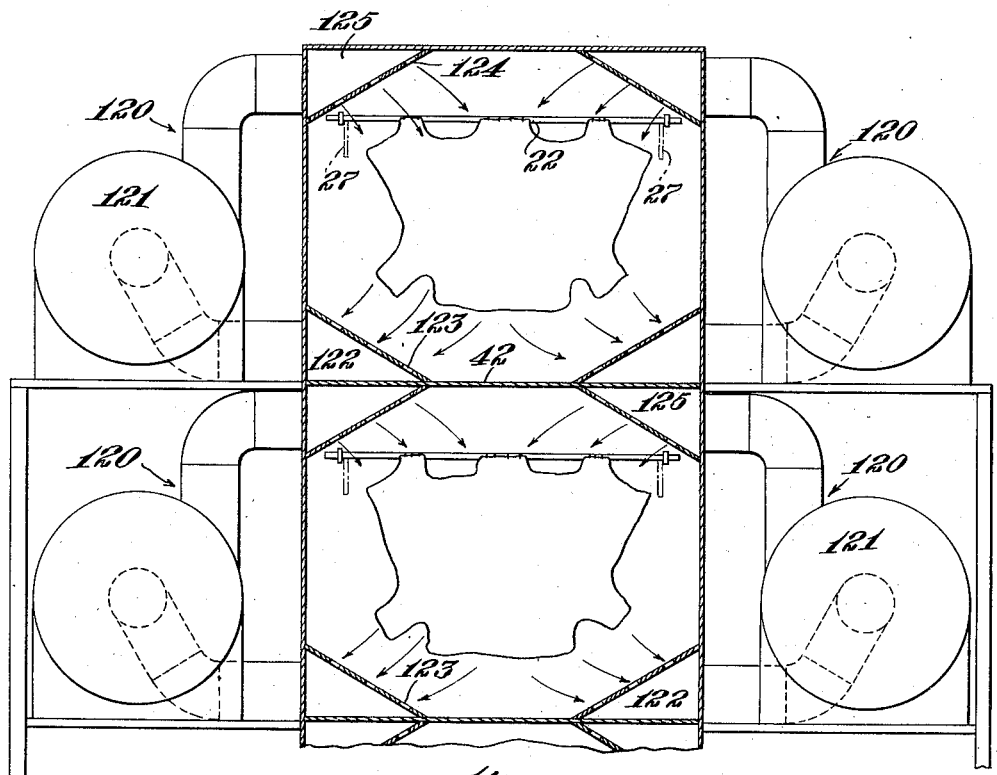
Figure 10:
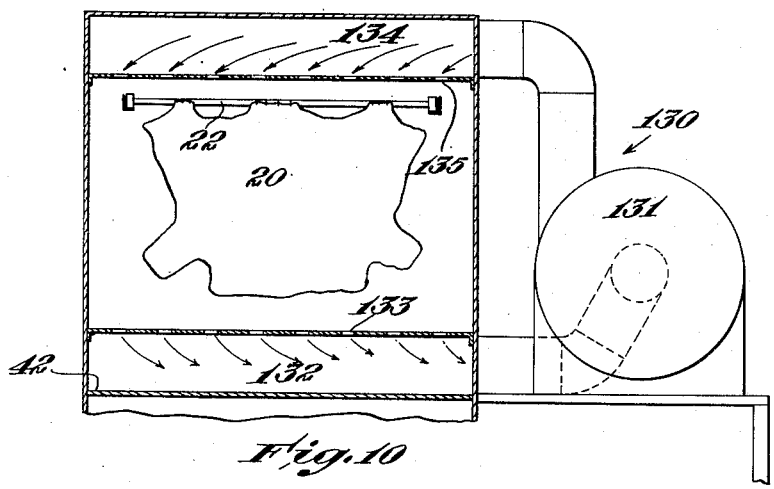
Figure 16:
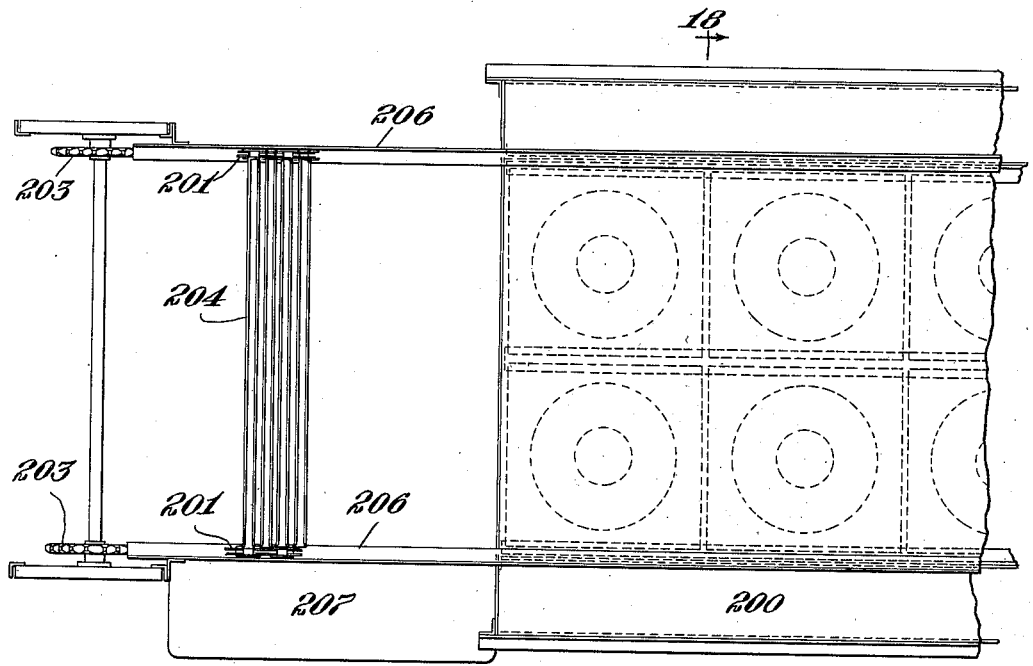
Figure 17:
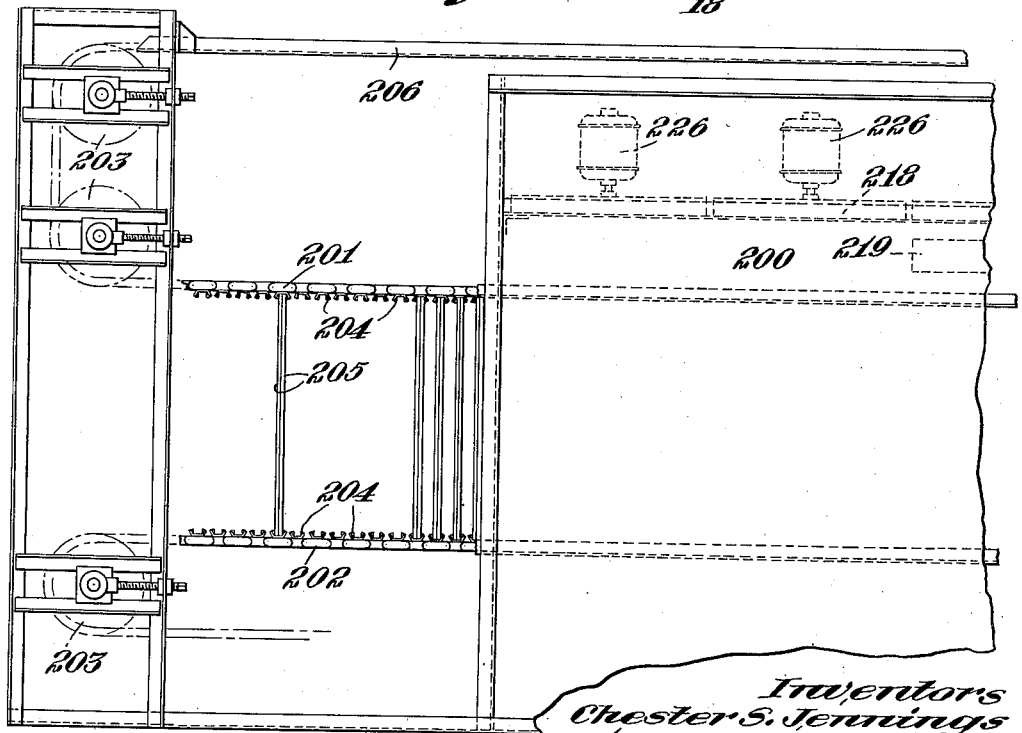
Figure 18:
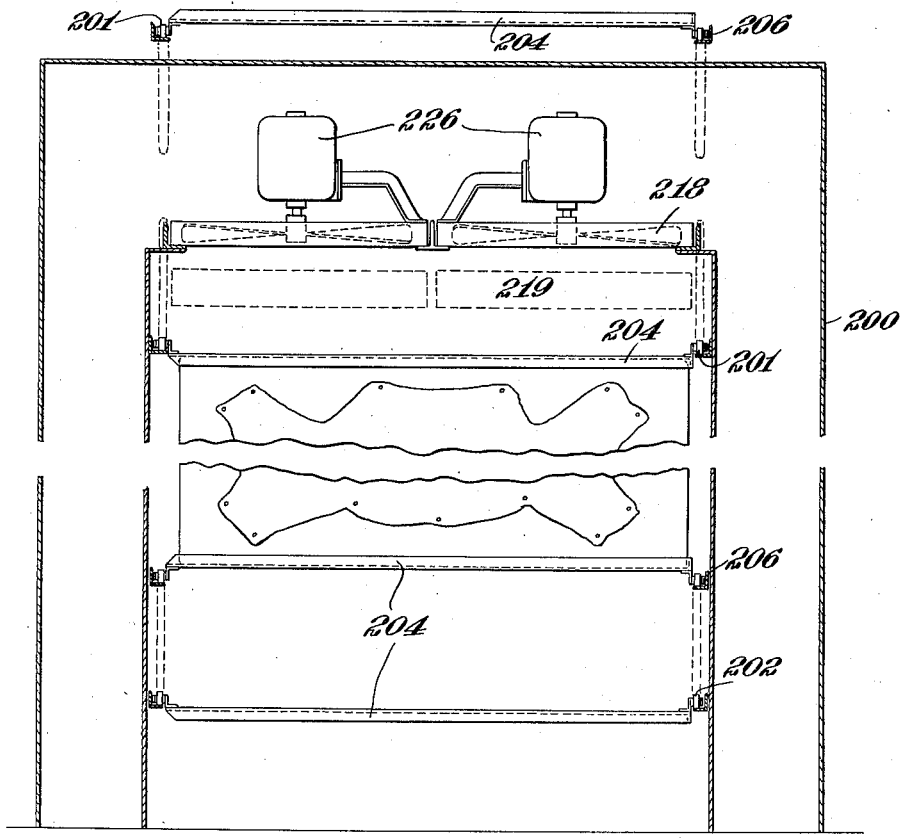
Figure 19:
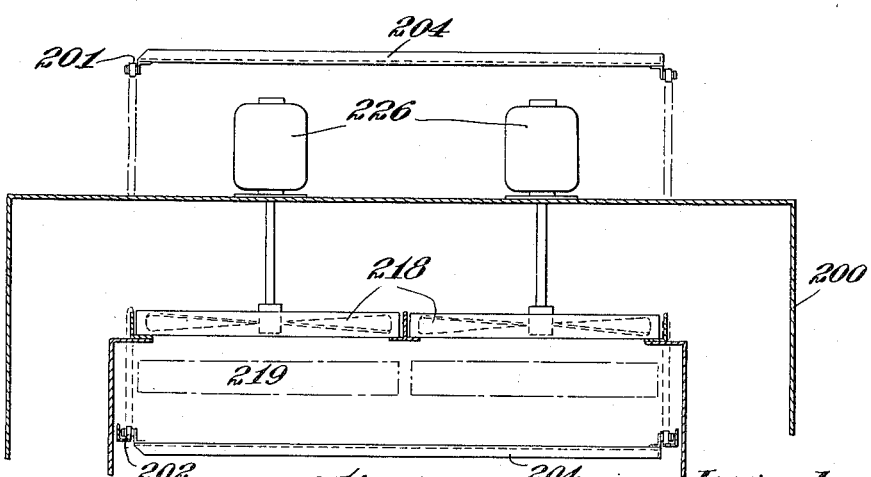
Figure 22:
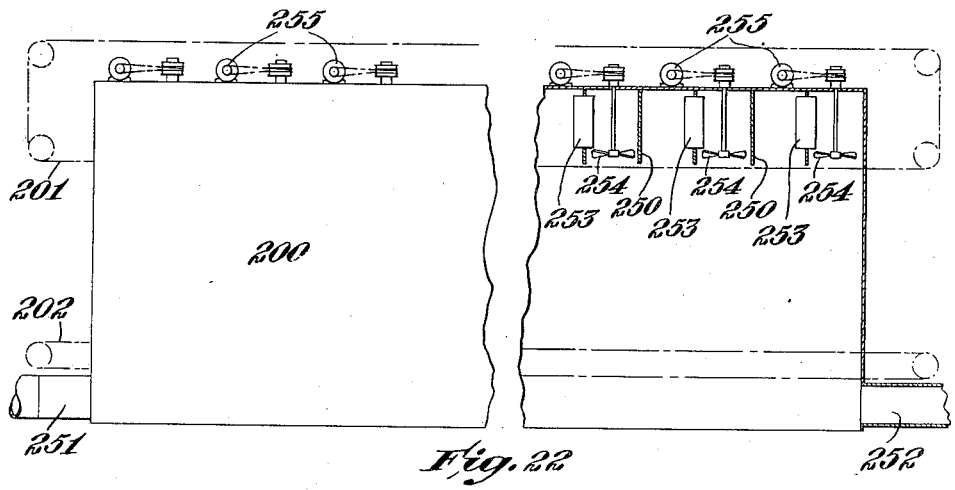
Figure 23:
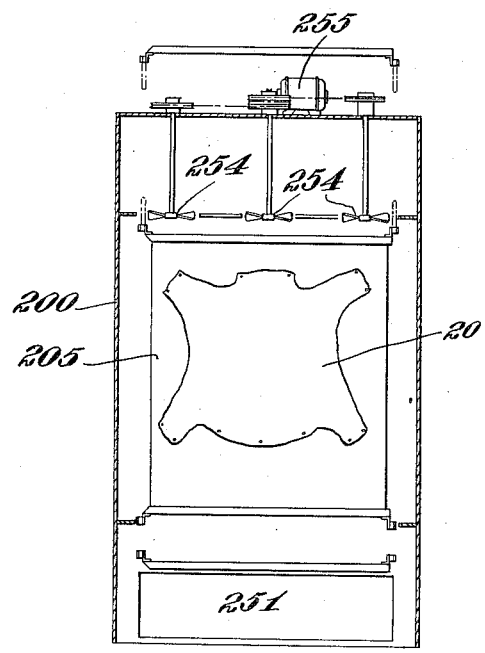

Fig. 5ᵃ is an enlarged sectional detail of an element shown in Figs. 4 and 5;

Fig. 6 is an enlarged end elevation taken along the line 6—6 in Fig. 2 illustrating the arrangement of vertical chains and tracks;

Fig. 7 is an enlarged cross sectional view taken along the line 7—7 in Fig. 2;

Fig. 8 is a diagrammatic side elevational view similar to Fig. 1 the center of the apparatus being omitted, illustrating one way of driving the various conveyors;

Fig. 9 is an enlarged cross sectional view taken along the line 9—9 in Fig. 1 illustrating one of the independent units which may be provided to circulate the drying air;

Fig. 10 is a view similar to Fig. 9 illustrating another form of such unit;

Fig. 11 is a diagrammatic side elevation illustrating one way of supplying and withdrawing drying air to the leather being treated;

Fig. 12 is a cross-sectional view taken along the line 12—12 in Fig. 11;

Fig. 13 is a view similar to Fig. 12 illustrating a modification of the structure shown in Figs. 11 and 12;

Figs. 14 and 15 are plan and side elevation views respectively illustrating diagrammatically a leather drying apparatus of the tunnel type;

Figs. 16 and 17 are enlarged plan and side elevation views respectively of the feeding end of such apparatus;

Fig. 18 is a cross-sectional view taken along the line 18—18 in Fig. 16 of an air circulating unit;

Fig. 19 is a view similar to Fig. 18 illustrating a modification of the air circulating unit there shown;

Figs. 20 and 21 illustrate diagrammatically in plan and side elevation views, respectively, a drying apparatus similar to that shown in Figs. 14 and 15 and provided with another form of air circulating mechanism;

Figs. 22 and 23 illustrate in side elevation with parts broken away and in plan an apparatus similar to that shown in Figs. 20 and 21 provided with still another form of air circulating mechanism;

Fig. 24 is a plan view of another modification of the apparatus shown in Fig. 14;

Fig. 25 is an enlarged longitudinal sectional view of a portion of the apparatus shown in Fig. 24;

Figs. 26 and 27 are plan and side elevation views, respectively, of the discharge end of a drying apparatus of the tunnel type illustrating still other means for supplying drying air thereto; and Figs. 28 and 29 illustrate in cross section two types of drying apparatus which may be employed for carrying out this invention.

One type of treatment of leather embodied in this invention will be briefly described with reference to Fig. 1 of the drawings. Each hide 20 is removed from a rack 21, secured to a rod 22 and loaded onto a vertical conveyor 23 by which it is raised through a passage 24 to one end of the upper compartment of the drier housing 25. A transfer conveyor 26 removes the hide from the vertical conveyor and delivers it to a horizontal conveyor 27 by which it is transported through such upper compartment. Upon arriving at the other end of that compartment the hide is transferred by a transfer conveyor 28 to a vertical conveyor 29 by which it is delivered to the second compartment. This travel of the hides continues in the same way through all the compartments. The vertical conveyor 30 which receives the hides after their travel through the final compartment transports them out of the drier housing to an operator who takes the hides from the conveyor and removes them from the rods, placing the hides on a rack 31 and returning the rods to a container 32.

The compartments of the housing 25 here shown are divided into two groups, an initial group comprising compartments 35, 36, 37 and 38 and a final group comprising compartments 39 and 40. The vertical passage 24 is separated from all the compartments except the upper compartment 35 by a wall 41. The compartments are separated from each other by horizontal partitions 42 spaced alternately from the end wall 43 of the housing and the wall 41 to permit the passage of the hides from one compartment to the next. A horizontal strip 44 in alignment with and spaced from the partition 42 between the bottom compartment 38 of the initial group and the top compartment 39 of the final group substantially seals the groups from each other. The bottom wall 45 of the housing is provided with a passage 46 through which the conveyor 30 delivers the hides.

Dry conditioned air is introduced into the housing 25 through the inlet 50 in the bottom compartment 38 of the initial group and after passing in a stream through all the compartments of that group is withdrawn from the housing through the outlet 51. The outlet 51 is on the top wall 52 of the housing and extends over the vertical passage 24 so that when the drier is in use a stream of air is set up which flows through this passage and serves to remove surface moisture from the hides as they move through the passage to the compartment 35. It will be noted that the stream of dry conditioned air flows in a direction opposite to that in which the hides travel. The air stream removes moisture from the hides with which it comes in contact so that when it leaves the housing its moisture content has been greatly increased. The hides in the compartment 38 have obviously a lower moisture content than those in the top compartment 35 and since the air with which they come in contact in compartment 38 has a low moisture content the hides therein are given a final drying so that when they enter the top compartment 39 of the final group they are to all intents and purposes "bone dry".

The amount of moisture picked up by the air stream depends upon the condition of the hides as they enter the housing and their texture. In order to meet such variations and insure that the hides entering the final group are substantially bone dry the air stream may be reconditioned during its passage through the compartments, portions of the air stream being withdrawn through the outlets 55 for reconditioning (i. e. lowering of the moisture content) and then returned through the inlets 56 to the housing. The number of times the air is thus withdrawn and reconditioned may of course be varied according to the condition and texture of the hides.

The hides entering the top compartment 39 of the final group are immediately subjected to the action of humid conditioned air which enters that compartment through the inlet 57 and flows in a stream through the compartment, in the same direction that the hides travel, to the outlet 58. The hides due to their bone dry condition quickly absorb moisture from this air stream so that when they leave the drier housing 25 they are in the most favorable condition for staking. The amount of moisture in the hides is controlled both by the moisture content of the humid conditioned air and also by the rate of travel of the air stream through the compartments. As to the second form of control it must follow that the air stream will naturally lose its effectiveness to transmit moisture to the hides and that by varying the speed the amount of effective air in the compartments can be controlled.

Various forms of apparatus for carrying out this treatment may be devised and that shown in Figs. 1 to 12 inclusive will first be described.

The hides to be dried designated as 20 are suspended from rods 22 during their travel through the housing. The conveyors are all of the parallel endless chain type, each chain being provided with suitably formed fingers which engage the ends of the rods 22. The rod 22 is provided at each end with a block or roller 60 spaced from the end and having certain functions which will be set forth hereinbelow. (See Figs. 4 and 5.)

The rods 22 are engaged inside the blocks 60 by the fingers 61 of the vertical conveyor 23, the fingers 62 of the horizontal conveyors 27, and the fingers 63 of the vertical conveyors 29 and 30, and are engaged outside the blocks by the fingers 64 and 65 of the transfer conveyors 26 and 28 respectively. The blocks 60 thus serve to prevent any undue longitudinal shifting of the rods 22 relative to the conveyors.

Each compartment of the drier housing 25 is provided with a horizontal conveyor 27, a transfer conveyor 28, and a vertical conveyor 29. In addition the upper compartment 35 is provided with the transfer conveyor 26 and the lowest compartment 40 is provided with the vertical delivery conveyor 30.

The chains of the vertical conveyor 23 pass at the top over sprockets 70 fixed on stud shafts 71 and at the bottom over sprockets 72. In the upper compartment 35 the chains of the transfer conveyor 26 pass over sprockets 73 fixed on the stud shafts 71 and over sprockets 74 which turn freely on stud shafts 75, the chains of the horizontal conveyor 27 pass over sprockets 76 which turn freely on the stud shafts 75 and over sprockets 77 which are fixed on stud shafts 78, the chains of the transfer conveyor 28 pass over sprockets 79 which turn freely on the stud shafts 78 and over sprockets 80 which are fixed on stud shafts 81 and the chains of the vertical conveyor 29 pass over sprockets 82 which are fixed on the stud shafts 81 and over sprockets 83 which turn freely on stud shafts 84. In the other compartments the chains of the horizontal conveyors 27 pass over sprockets 85 which turn freely on stud shafts 86 and over sprockets 87 which are fixed on stud shafts 88, the chains of the transfer conveyors 28 pass over sprockets 89 which turn freely on the stud shafts 88 and over sprockets 90 which are fixed to stud shafts 91 and the vertical conveyors 29 and, in the lowest compartment 30, pass over sprockets 92 which are fixed to the stud shafts 91 and over sprockets 93 which turn freely on stud shafts.

The various stud shafts are mounted in bearings supported in any suitable way on the frame of the drier housing. It will be noted that all the stud shafts except 75, 84, 86 and 94 serve to drive conveyors and one way for supplying power thereto is shown in Fig. 8. Motors 95 actuate the drive stud shafts at one end of the housing and motors 96 actuate the drive stud shafts at the other end. While only the motors at one side of the housing are here shown in the drawings it will be understood that there are similar motors at the other side and that the description here given applies to both. The motor 95 drives the stud shaft 71 and through the bevel gearing, shown more or less diagrammatically, drives the stud shafts 91 at the same rate of speed. The stud shafts 88 are driven at a lower rate of speed from the adjoining stud shafts 91 by similar gearing. The motor 96 in like manner drives the stud shafts 78 at a uniform rate and the stud shafts 81 at a higher rate of speed.

The shafts may be considered as forming two groups, the first comprising the shafts 71, 81 and 91 which drive the vertical and transfer conveyors and the second comprising the shafts 78 and 88 which drive the horizontal conveyors. The shafts of each group are driven at a uniform rate of speed.

The hides as they travel horizontally through the compartments are fairly close together, e. g. the rods 22 are spaced four inches apart, but when they travel vertically the hides must be kept out of contact and hence the rods are spaced much further apart, e. g. four feet. This requirement is met first; by setting the rates of speed of the two groups of shafts correspondingly so that under the conditions mentioned above the shafts of the first group travel twelve times as fast as the shafts of the second group and second; by spacing the fingers of the conveyors correspondingly distances apart, the fingers on the conveyors driven by the first group of shafts being four feet apart and the fingers on the conveyors driven by the second group of shafts being four inches apart. It will be noted that with these adjustments the hides will be moved by the conveyors 27 at one twelfth the speed they are moved by the conveyors 23, 26, 28, 29 and 30.

The sprocket 73 on shaft 71 by which the conveyor 26 is driven is slightly out of register with the sprocket 70, on the same shaft, by which the conveyor 23 is driven, so that the fingers 61 on the latter conveyor slightly precede the fingers 64 on the former conveyor. The rod 22 of each hide raised by the conveyor 23 is carried by the fingers 61 onto a pair of guide strips 100 with which the blocks or rollers 60 engage. As shown on Fig. 4 the rod is moved along the strips 100 by the fingers 61 of the conveyor 23, then, as the fingers leave the rod and descend around the sprockets 70, by the fingers 64 of the conveyor 26 and finally as the fingers 64 leave the rod, by the fingers 62 of the conveyor 27. The ends of the strips 100 are inclined so that the rods, after passing the sprockets 75 and 76, are guided onto the chains of the conveyor 27, the blocks 60 being at the outer sides of the chains and thus preventing undue lateral shifting of the rods.

The fingers 61, and 62, are rigidly fixed upon the chains of the conveyors 23 and 29 and may, if desired, be made integral with links thereof as shown in the drawings. The fingers 64 of the conveyor 26 however are preferably movable relative to the chains to facilitate the transfer of the rods without interference. Each finger 64 is mounted at the inner end of a pin 101 freely rotatable within a sleeve 102 by which two inner and outer links of the chain are connected in the usual manner. At the outer end of the pin 101 is fixed one end of an arm 103 carrying a roller 104 at the other end of the arm (see Fig. 5ᵃ). The roller 104 during practically its entire travel rides on either the cam 105 or the cam 106. The cam 105 in general follows the path of the chain from the sprocket 74 around the sprocket 73 and back to the sprocket 74. The roller 104 rests on the outer face of the cam so that the finger 64 is held in the functioning position. The portion of the cam 105 below the shaft 71 is slightly depressed and the roller is held in contact therewith by a short cam 107. The cam 106 engages the roller 104 during a portion of its travel around the shaft 75 between the ends of the cam 105. The roller rides on the inner face of the cam so that the finger is rearwardly inclined. As the finger passes the end of the cam 105 gravity acts on the roller 104 to swing the finger backwardly in which position it is held by the cam 106. The forward end of the cam 105 is upwardly inclined to engage the roller 104 and swing the finger into the functioning position. Projecting from the finger 64 is a tongue 108 which engages the adjacent edge of the chain and serves as a limit stop to check the movement of the finger as it reaches the functioning position.

The fingers 61 and 64 are moved in unison and as the fingers 61 raise a rod the fingers 64 swing in slightly behind the fingers 61 so that they engage and advance the rod along the strips 100 as the fingers 61 move downwardly. The cams 105 and 107 coact to swing the fingers 64 backwardly as they move into register with the fingers 61 thus avoiding any collision with the rod being advanced by the fingers 61. Similarly as the fingers 64 register with the fingers 62 the rollers 104 leave the cam 105 so that, as pointed out above, the finger swings backwardly from the rod which is now engaged and advanced by the fingers 62 with which they register. The speed of travel of the fingers 64 is so determined that they will register with each pair of fingers 62 and consequently each pair of such fingers will advance a rod and the hide carried thereby so long as the operators supply a rod and hide to each pair of fingers 61.

As the rods approach the end of compartment 35 the rods are removed from engagement with the fingers 62 by the fingers 65 of conveyor 28 and advanced into engagement with the fingers 63 of conveyor 29. The fingers 62 and 65 are so mounted and driven that each pair of fingers 62 will register with a pair of fingers 65 as the rods 22 pass above the shafts 78 and similarly the fingers 65 and 63 will register as the rods 22 pass above the shafts 81. The fingers 63 deliver rods to each pair of fingers 62 of the succeeding conveyor 27. The rod engaging portion of each finger 63 is recessed to receive the rod and cradle it securely during its downward travel. The fingers 63 and 65 are rigidly mounted upon and preferably integral with the chains of the conveyors 29 and 28 respectively in the same manner as are the fingers 61 and 62 of the conveyors 23 and 27 respectively.

Suitable guard rails 109 extend over and are spaced from the fingers of the various conveyors to oppose any tendency of the rods to leave engagement with the fingers. The rails 109 further serve to position the rods on the conveyors 27 as they are delivered thereto by the fingers 63 of the vertical conveyors 29.

The chains of the various conveyors are of the roller type and travel in tracks suitably mounted on the housing between the conveyor sprockets. The tracks 110 of the vertical conveyors 23 and 29 and the tracks 111 of the upper runs of the transfer conveyors 26 and 28 are right angular in cross section. The tracks 112 of the lower runs of conveyors 26 and 28 are merely flat strips on which the rollers ride. The tracks 113 of the upper runs of the horizontal conveyors 27 are U-shaped in cross section while the tracks 114 of the lower runs of those conveyors are rectangular in cross section, the inner lower corner and portions of the adjacent bottom and inner wall being broken away to allow the fingers 62 to travel without interference.

As stated above the hides being conveyed through the housing are subjected to the action of streams of air. Since the hides travel close together through the compartments the air streams are prevented from direct surface contact therewith except as the hides move vertically. In order to attain such contact a plurality of supplementary units may be provided by which air is forced across and into direct contact with the faces of the hides. On Fig. 1 is indicated several such units designated by the numeral 120. The number and arrangement of the units may be varied as desired.

As shown in Fig. 9 the units are preferably arranged in pairs on opposite sides of the housing, each pair acting simultaneosuly upon the same hide. Each unit 120 comprises blower 121 which draws air from a chamber 122 at a lower corner of the compartment and connected by apertures 123 in the inner wall with the interior of the compartment and blows it over the hides through apertures 124 in the inner wall of a chamber 125 at the upper corner of the compartment. The air thus set in motion travels diagonally across the hides thus contacting from the upper corners thereof with the entire surfaces and in addition holding the hides extended and counteracting any tendency of the lower corners to curl as the hides dry.

Fig. 10 shows a unit 130 which may be substituted for a pair of the units 120. The unit 130 comprises a blower 131 by which air is withdrawn from the housing through a chamber 132 at the bottom of the compartment and connected thereto by a plurality of apertures 133 and returned to the housing through a chamber 134 at the top of the compartment connected thereto by a plurality of apertures 135. The air is thus blown down over the hides removing the moisture therefrom and also preventing the lower edges from curling up.

In place of the air circulating systems previously described that shown diagrammatically in Fig. 11 may be employed. The housing 25' corresponds in all respects to the housing 25 with the exception that the air instead of being caused to flow in streams through a plurality of compartments is introduced into and withdrawn from each compartment. As here shown the 6 compartments are grouped in three pairs and each pair is supplied with air of a certain moisture content and temperature by an independent unit. Thus compartments 35' and 36' are supplied by the unit 140, compartments 37' and 38' by the unit 141 and compartments 39' and 40' by the unit 142. Each unit includes a blower 143. The units 140 and 141 also include a heater 144 and the unit 141 includes in addition an inlet 145 by which additional air from without can, if desired, be supplied to the unit. The unit 142 may be provided with an air humidifier or the air circulated as taken from the compartments. As shown in Fig. 12 the air is introduced into the housing through conduits 150 and withdrawn therefrom through conduits 151. These conduits are connected with ducts 152 and 153, respectively, located at the corners of the compartment and provided with apertures 154 through which the air enters or leaves the compartment. The air escapes from the ducts 153 of the upper compartment 35' through an exhaust pipe 155. Thereby the air is blown diagonally upwardly or downwardly across the hides, the arrangement of the ducts being reversed in the successive compartments so that the conduit 150 from each unit supplies air to both compartments of the group served by that unit.

An alternate arrangement of ducts is shown in Fig. 13. Air is supplied by each unit through a conduit 160 to a single duct 162 which extends across the compartment and is withdrawn by a conduit 161 through a single duct 163. Apertures 164 permit the air to enter or leave the compartments. The arrangement of ducts is reversed as in the construction shown in Fig. 12 and the air is blown directly down or up over the surfaces of the hides.

The apparatus disclosed in Figs. 14 to 29 inclusive and now to be described is of the tunnel type in which the hides travel in a straight line being fed into one end of the tunnel and discharged from the other end. The hides are here shown as mounted upon boards and not suspended from rods. The hides are preferably treated in pairs, two boards placed back to back with the hides supported thereon exposed being handled as a unit.

The various types of drying apparatus of the tunnel type here shown differ from each other in the handling of the drying air and each comprises a housing 200 equipped with a conveyor which includes four chains arranged, two at the top of the housing designated as 201 and two at the bottom of the housing designated as 202 and a plurality of suitably arranged chain supporting sprockets 203. Mounted in register on the upper and lower pairs of chains are channular carriers 204 by which pairs of hide carrying boards 205 are supported and advanced through the housing 200. The chains may be of any well known type guided by tracks 206 and driven by suitable power means not shown. The boards 205 are slipped between a pair of carriers, a feed table 207 being mounted at one side of the conveyor at the entrance to the housing to serve as a preliminary support.

In the type shown in Figs. 14 and 15 inclusive the tunnel may be considered as comprising six compartments designated 210 to 215 respectively.

The hides under treatment are subjected to a stream of unconditioned air as they pass through the first five compartments and to a stream of conditioned air as they pass through the final compartment 215. Air is forced into the housing at room temperature into compartment 214 through a conduit 216 and withdrawn from compartment 210 through a conduit 217. Each of compartments 210, 212 and 214 are provided with fans 218 and heaters 219 by which the air is kept in motion and its temperature is raised. The fans and heaters are mounted in the upper portions of the compartments so that the hides travel undisturbed below them. Baffle plates 220 define the compartments and assist in guiding the air. The air, by the action of the fans 218 and heaters 219, is heated and forced downwardly in compartments 214, 212 and 210, and rises in compartments 213 and 211. The spaces at the sides of the conveyor are closed as shown in Fig. 29 to confine the travel of the air so that it will contact repeatedly with the hides under treatment.

Air conditioned by the dehydrator unit 221 is introduced into the compartment 215 of the housing through a conduit 222 and withdrawn therefrom through a conduit 223. A plurality of fans 224 and heaters 225 mounted in the compartment 215 over the hides keep the conditioned air in motion downwardly directly across the surfaces of the hides and raise the temperature of the air.

As the hides move through the housing they are acted upon by vertically travelling streams of air those in compartments 211 and 213 moving upwardly and those in the other compartments moving downwardly. The moisture content of the air streams decreases as the hides travel that in compartment 214 being of heated room air and that in compartment 215 being of heated conditioned air.

When the temperature of the drying air is comparatively low the motors 226 by which the fans 218 and 224 are driven are mounted within the casing of the housing 200 as shown in Fig. 18. When, however, the drying air is at a higher temperature the motors 226 are preferably mounted outside the casing and the return run of the chains 201 is accordingly raised (see Fig. 19).

Figs. 20 and 21 illustrate another form of apparatus in which, beside the room air and the conditioned air units employed in the apparatus shown in Figs. 14 and 15, additional units are provided. The housing 200 is divided into seven compartments numbered 230 to 236, inclusive, separated by baffle plates 237. The air streams flow directly over the hides as indicated in Fig. 29. The first two compartments are equipped with independent air units 238. Each unit includes a fan and heater member 239, an intake conduit 240 and an exhaust conduit 241. The units are so arranged that the heated air flows downwardly over the hides as they travel through compartment 230 and upwardly over the hides as they travel through compartment 231. The hides as they pass through compartments 232, 233, 234 and 235 are subjected to a stream of room air which enters compartment 235 through conduit 242 is advanced by fans 243 and acted on by heaters 244, both fans and heaters being mounted at the top of sections 233 and 235, and passes off through conduit 245. A conduit 246 connects the conduits 242 and 245 and serves as a by pass to permit the recirculation of part or all of the air, as desired, shutters 247 permitting this control. The hides passing through the final compartment 236 are subjected to a stream of heated conditioned air which passes from a dehydrator unit 248 through a conduit 249, into the housing, is advanced by fans 250, part passing through heaters 251, over the hides and returns to the dehydrator unit through a conduit 252. The heating units 238 which act upon the hides as they pass through compartments 230 and 231 may or may not be set into operation depending upon the condition of the hides under treatment.

Figs. 22 and 23 illustrate another form of drying apparatus of the tunnel type. This follows in general construction the apparatus shown in Figs. 14 and 15 and Figs. 20 and 21 having the cross section shown in Fig. 29. The housing 200 is divided into a plurality of compartments by means of baffle plates 250 mounted in the housing above the lower runs of the conveyor chains 201. There are no baffle plates below the conveyor chains 202 and a continuous stream of air is set up through that part of the housing. The air which may or may not be conditioned and which may or may not be heated is introduced into the feeding end of the housing by a conduit 251 and withdrawn from the discharge end thereof by a conduit 252. Mounted in the upper part of all or some of the compartments are air heating and circulating units. Each unit comprises a heater 253 mounted parallel to and in alignment with the baffle plates, and a battery of fans 254 (three being here shown) driven by a motor 255. The fans 254 set up a current of air from the stream in the lower part of the housing, through the heaters 253 and back to the stream. This current of air passes between the hide supporting boards and over the hides to remove moisture therefrom.

A form of drying apparatus wherein the air is recirculated in each compartment passing in one direction only over the hides and passing in the other direction at the sides of the conveyor is shown in Figs. 24, 25 and 28. The housing 200 is divided at top and bottom into a plurality of compartments designated as 260, to 265 inclusive. At the upper section of each compartment are provided fan units 266 and fan and heater units 267 the latter differing from the former in that they include, beside a fan 268, a heater 269 (see Fig. 25). The units of the various compartments are independently operated by means not shown so that the units in all or any number of compartments can be operated as the conditions of the hides under treatment require.

In compartments 260 to 264, inclusive, the air circulated enters with the hides. Conditioned air is, however, supplied to compartment 265 from a dehydrator unit 270 through a conduit 271 and returned to the unit through a conduit 272.

The units in the compartments 260 and 261 are arranged in a single centrally located row (see Fig. 24) so that the drying is started along the longitudinal center of the hides. It is obvious that since the centers are the portions which dry most slowly this arrangement insures a thorough drying of the entire surface of the hides.

Figs. 26 and 27 illustrate a modification of the apparatus shown in Fig. 24 in that conditioned air is supplied to the next to the last compartment designated by the numeral 275 and moist air is supplied to the last compartment designated by the numeral 276. Conduits 277 and 278 feed to and withdraw from the compartment 275 the air conditioned by a dehydrator unit 279. Similarly conduits 280 and 281 serve the compartments 276 with air prepared by a humidifier unit 282. The compartments are provided with fan units 283 and fan and heater units 284 similar to the units 266 and 267 of the apparatus shown in Fig. 24.

The final treatment of the hides with humidified air is, under some conditions, of advantage since the hides are thereby discharged from the apparatus with a predetermined amount of moisture therein.

One feature of this invention is to localize the direction of the air streams so that they contact primarily definite areas of the hides. One means for so doing is shown in Fig. 24 where the units in compartments 260 and 261 act directly upon the longitudinal centers of the hides. Other means for so doing might be provided, as for example, the apertures through which the air streams are directed upon the hides in the constructions shown in Figs. 9, 10, 12 and 13 might be restricted in number in certain at least of the compartments to direct the streams so that they contact initially with the longitudinal centers of the hides. Similarly where conditions require it portions of the hides other than the longitudinal centers may be contacted primarily by the air streams as by shifting the locations of the units in compartments 260 and 261 or the apertures provided in Figs. 9, 10, 12 and 13.

Various forms of apparatus embodying this invention have been shown and described in order to bring out several ways of drying the leather. It will, however, be understood that the invention is not limited to the specific structures and arrangements disclosed and that changes may be made therein without departing from the spirit and scope of the invention as set forth in the following claims.

We claim:

1. That treatment of leather which includes the following steps; transporting the leather through a plurality of compartments divided into two groups, subjecting the leather as it travels through the initial group of said compartment to the action of a stream of dry conditioned air set up in that group of compartments by which the moisture content of the leather is reduced and thereafter subjecting the leather as it travels through the final group of compartments to the action of a stream of humid conditioned air set up in that group of compartments by which the moisture content of the leather is increased to a predetermined amount, the stream of air set up in the initial group of compartments flowing in a direction opposite to that in which the leather travels and the stream of air set up in the final group of compartments flowing in the same direction as that in which the leather travels.

2. That treatment of leather which includes the following steps; transporting the leather through a plurality of compartments divided into two groups, reducing the moisture content of the leather as it travels through the initial group of compartments by subjecting it to the action of a stream of dry conditioned air set up in that group of compartments in a direction opposite to that in which the leather travels, reconditioning a part at least of the air stream as it flows through such compartments, and increasing the moisture content of the leather to a predetermined amount as it travels through the final group of compartments by subjecting it to the action of a stream of humid conditioned air set up in that group of compartments in the same direction as that in which the leather travels.

3. That treatment of hides which includes the following steps; transporting the hides through a plurality of compartments subjecting the hides as they travel through certain at least of the compartments to the action of streams of air set up in such compartments, said streams flowing at right angles to the path of travel of the hides, and impacting the surfaces thereof diagonally.

4. That treatment of hides which includes the following steps; transporting the hides through a plurality of compartments subjecting the hides as they travel through certain at least of the compartments to the action of streams of air set up in such compartments, said streams flowing at right angles to the path of travel of the hides and those in one or more compartments impacting the longitudinal center of the hide surfaces.

5. That treatment of hides which includes the following steps; transporting the hides through a plurality of compartments, subjecting the hides as they travel through certain at least of the compartments to the action of streams of air set up in such compartments, said streams flowing at right angles to the path of travel of the hides, the streams in certain of said compartments flowing both upwardly and downwardly over the hides.

6. Drying apparatus comprising a housing divided into a plurality of compartments, conveyor mechanism for advancing the material to be dried through the compartments seriatim, ducts extending longitudinally at the top and bottom of certain of said compartments and connected therewith through apertures in the walls of the ducts, and means for supplying air to said compartments through certain of said ducts and withdrawing it therefrom through other of said ducts, the air in the passages between the ducts traveling at right angles to the path of travel of the material.

CHESTER S. JENNINGS.
FRANK W. GERARD.